United States Patent Office 2,702,784
Patented Feb. 22, 1955

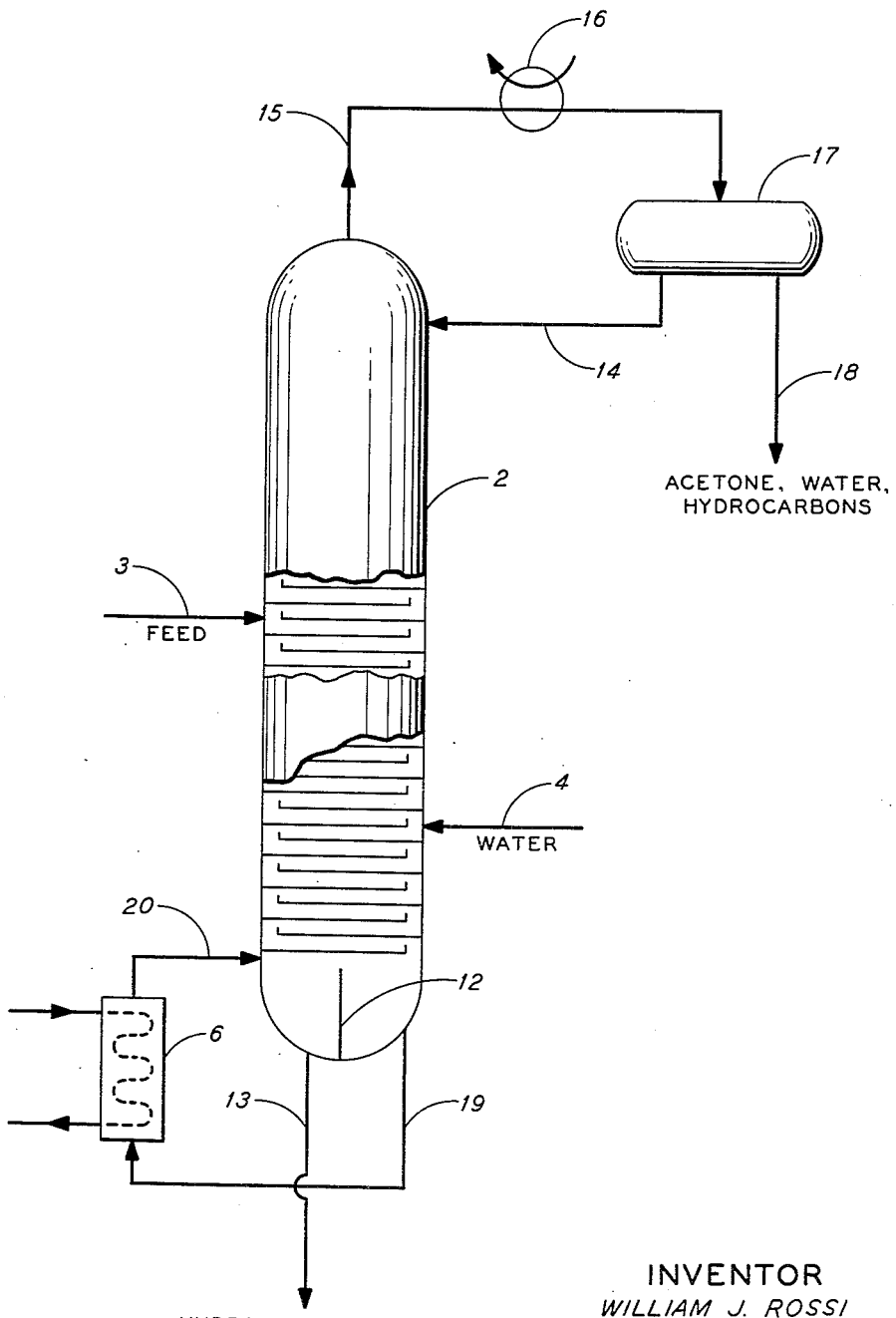

2,702,784

AZEOTROPIC REMOVAL OF HYDROCARBON CONTAMINANTS FROM PHENOL

William J. Rossi, Berkeley, Calif., assignor to California Research Corporation, San Francisco, Calif., a corporation of Delaware Application June 26, 1952, Serial No. 295,611

4 Claims. (Cl. 202—42)

A process has recently been developed for producing phenol from cumene. The fundamental chemistry involved in this process was described by Hock and Lang in Berichte, vol. 77, p. 257 (1944). Phenol is produced pursuant to this process by oxidizing cumene with air to produce a reaction mixture consisting predominantly of cumene and cumene hydroperoxide. The cumene hydroperoxide in the reaction mixture is concentrated by a vacuum or steam distillation and is then split with the aid of an acid catalyst to form phenol and acetone. Upon neutralizing the resulting product mixture and desalting it, phenol and acetone are separated from each other and subjected to purification in order to meet their particular specifications.

The great bulk of the phenol of commerce is required to pass the water dilution test described in U. S. Pharmacopoeia (XIVth revision, p. 458). This test requires that one part of phenol dissolve in 15 parts of water to produce a clear solution. If the solution is turbid, the phenol does not meet specification. In practical effect this test requires that acceptable phenol have an extremely low content of hydrocarbons, i. e., below about 0.05% by weight. If the phenol contains minor quantities of acetophenone, the hydrocarbon tolerance is substantially reduced. In the production of phenol from cumene, considerable difficulty is encountered in recovering phenol which will pass the aforementioned water dilution test. Small quantities of alkyl aromatic hydrocarbons, in particular of butyl benzenes, are commonly present in any practical cumene feed. These materials in considerable part pass through the process unchanged and appear as contaminants in the phenol product, from which they cannot be separated by conventional distillation methods. In addition, side-reactions occurring during the oxidation and cleavage steps cause formation of by-product alkyl aromatic hydrocarbons which likewise cannot be readily separated from phenol by known distillation methods. As a matter of fact, the separation from phenol of hydrocarbons boiling in the range from about 170 to about 210° C., especially of alkyl aromatic hydrocarbons, by known distillation techniques is not only impractically difficult but often is entirely impossible, since the boiling points of these hydrocarbons lie close to the boiling point of phenol, and furthermore since they form azeotropes with phenol, which also boil very close to the boiling point of pure phenol.

It has now been found that phenol essentially free from hydrocarbons boiling in the range from about 170 to about 210° C. can be prepared from mixtures consisting predominantly of phenol and acetone and containing a minor, though substantial, proportion of such hydrocarbons, which mixtures are commonly produced by splitting cumene hydroperoxide concentrates with the aid of an acid catalyst. This is achieved by feeding such a mixture into a rectification zone at an intermediate point therein, introducing water, preferably in the form of steam, into this rectification zone at a point between the point of feed introduction and the bottom of the rectification zone in an amount sufficient to produce a liquid phase having a water content of at least 10% by weight in the portion of the rectification zone between the point of water introduction and the point of feed introduction. This liquid phase with a water content of at least 10% by weight is co-existent with a vapor phase which consists to the extent of at least 80% by weight of water vapor or steam. The temperature in the bottom of the rectification zone is maintained at a figure at least equal to the boiling point of phenol (182° C.), while the temperature at the top of the rectification zone is near the boiling point of water. The presence of water in substantial quantity in the liquid phase on the distillation plates or trays below the point of feed introduction increases the volatility of the hydrocarbons boiling from about 170 to about 210° C. with respect to phenol and at the same time tends to break the hydrocarbon-phenol azeotropes. The vapors of hydrocarbons, water and acetone are withdrawn from the top of the rectification zone and condensed, a portion of the condensate being returned to the rectification zone as a reflux. Meanwhile, dry phenol, essentially free of alkyl aromatic hydrocarbons boiling from about 170 to about 210° C. is withdrawn from the bottom of the rectification zone.

The practice of the invention may be illustrated by reference to the appended drawing. In the drawing, rectification zone 2 is ordinarily constituted by a distillation column having a separation efficiency of 20 or more theoretical plates or trays, generally an efficiency of about 35 theoretical plates. A suitable column can have about 60 bubble-cap trays, each of them having an efficiency of about 60%. The phenol-containing feed, heated to about its bubble point is continuously introduced into the rectification zone through line 3, at a point about 30 to 40 trays distant from the bottom thereof. Water is continuously introduced either in the form of steam or as liquid water at about the tenth tray from the bottom through line 4. The quantity of water introduced into the rectification zone in accordance with the invention is ordinarily equal to from about 90% by weight to about 150% by weight of the phenol content in the feed. This quantity of water is sufficient to give on the trays of the rectification zone between the point of water introduction and the point of feed introduction, for example, between the tenth tray and about the thirtieth tray, a liquid phase with a water content of at least 10% by weight, and usually between 30% and 45% by weight based on the total liquid mixture present on the trays of rectification zone 2. Correspondingly a vapor phase having a water-vapor or steam content between about 80 to 90% by weight is present in this portion of the rectification zone. The bottom trays in the rectification zone (the lowest ten trays shown on the drawing) are used to dehydrate the phenol. The temperature at the bottom of the rectification zone is maintained at or slightly above the boiling point of phenol, and the temperature at the top of the rectification zone is held near the boiling point of water. Rectification zone 2 is ordinarily operated with the pressure at the top of this zone being about equal to the atmospheric pressure, although either superatmospheric or subatmospheric pressures may be employed, if advantageous under the circumstances. The temperatures at the top and bottom of rectification zone 2 are described as being approximately the boiling points of water and phenol, respectively, in the sense of being at the boiling points of these two substances, corresponding to the pressures existing in the rectification zone. A vapor fraction is withdrawn overhead through line 15 and passes through water-cooled condenser 16, whence a condensate consisting predominantly of acetone, water and hydrocarbons is passed into a reflux drum 17. A portion of the condensate is returned to the top of rectification zone 2 as reflux through line 14, and the remainder is taken out through line 18 for further separation and purification of acetone. Reflux drum 17 ordinarily is operated at a temperature ranging from 50 to 100° C. at atmospheric pressure, although if desired, it may be operated under vacuum. The reflux ratio may range from 0.2:1 to 2:1, preferably being about 1:1, based on the net overhead. The phenol-rich liquid descending from the lower trays of rectification zone 2 drops to the bottom thereof which is provided with a baffle 12 and passes through line 19 into reboiler 6, returning to the rectification zone through line 20 at a temperature approximating the boiling point of phenol. Those components which boil at a temperature below the boiling point of phenol rise through the dehydration section of zone 2 and are taken out overhead. Dry phenol essentially free from alkyl aromatic hydrocarbons boiling up to 210° F. is withdrawn from the bottom of rectification zone 2 through line 13 for final purification which is accomplished by removing any remaining contaminants, such as cumyl phenol and higher boiling materials, from it by distillation.

In a typical operation of the process the feed introduced into rectification zone 2 through line 1 contains a small amount (0.0 to 0.2% by weight) of acetaldehyde, 43.1% by weight of acetone, 6.3% of water, 0.9% of cumene, 4.6% of alpha methyl styrene, 2.6% of acetophenone, 38.3 of phenol, 0.2 to 0.5% of hydrocarbons boiling from about 170 to about 210° C. (mainly alkyl aromatic hydrocarbons), and 3.7% of heavier hydrocarbons and phenols. By using a quantity of water, which is approximately equal to the weight of phenol in the feed to effect the separation of the undesirable hydrocarbons from phenol in accordance with the invention, an overhead fraction is recovered and is found to contain 45.6% by weight of acetone, 47.1% of water, 1% of cumene, 4.9% of alpha methyl styrene, 0.5% of hydrocarbons boiling between 170 and 210° C., and 0.9% of phenol and all of the small quantity of acetaldehyde contained in the original feed. The phenol product withdrawn from the bottom of rectification zone 2 contains 85.7% by weight of phenol, 5.9% of acetophenone, 8.4% of higher-boiling materials such as cumyl phenol and alpha-methyl styrene polymers, and less than 0.05% by weight of hydrocarbons boiling from about 170 to about 210° C. This bottoms phenol product is then fractionally distilled to recover substantially pure phenol. Of the total phenol contained in the feed, 98% by weight is recovered in the bottoms product and only 2% by weight goes overhead. Although the processing conditions may be varied considerably, the phenol content of the overhead fraction amounts to less than 3% of the total phenol charged to the rectification zone. The small quantity of phenol contained in the overhead fraction is readily recoverable by extraction with caustic.

That the process above described accomplishes the substantially complete removal of the undesirable hydrocarbons from the phenol, without taking a very substantial proportion of the phenol overhead, constitutes an entirely unexpected result. Phenol and water form an azeotrope which boils below the boiling point of water and which contains about 10% by weight of phenol. It would be expected that the employment of water in the amount and manner described would necessarily result in carrying overhead a large proportion of the phenol contained in the feed. This does not occur, however, and while the failure of such occurrence cannot be explained with certainty, it appears that the hydrocarbons contained in the feed act to suppress the tendency of phenol and water to form an azeotrope, and the acetone in the feed also tends to reduce the quantity of phenol removed overhead due to the azeotroping effect of the water.

My new method of separating alkyl aromatic hydrocarbon contaminants from phenol can be effectively applied to any mixture of organic components containing phenol and hydrocarbons which boil so close to the boiling point of phenol as to present difficulties in separating these hydrocarbons from phenol by conventional disillation techniques. For instance, instead of effecting the separation of these hydrocarbons from phenol by introduction of water or steam at the time of distilling the crude phenol fraction from the crude acetone fraction of a liquid organic feed mixture as described hereinabove, one may first separate such liquid mixture by fractional distillation into a crude acetone fraction and a crude phenol fraction. Thereupon the crude phenol fraction is distilled, taking the bulk of phenol overhead, and withdrawing the heavier components as bottoms. The overhead phenol is then distilled using water or steam, as described hereinabove, and phenol meeting the specifications of U. S. Pharmacopoeia is withdrawn from the bottom of the distillation column.

In the practice of my invention the presence of large quantities of water and steam in the distillation column not only permits an efficient separation between phenol and alkyl aromatic hydrocarbons, but furthermore results in much lower temperatures throughout most of the distillation column. As a consequence, chemical reactions tending to occur between the phenol and other components present in the feed mixture are retarded and corrosion in the distillation column is substantially reduced.

It is to be understood that various modifications of my invention can be practiced by those skilled in the art without departing from the scope or spirit of the disclosure and are, therefore, includible within the scope of the following claims.

I claim:

1. A method which comprises continuously introducing into a distillation zone at an intermediate point thereof a feed-mixture, the predominant components of which are phenol and acetone and which contains less than about 0.5% but more than about 0.05% by weight of alkyl aromatic hydrocarbons boiling in the range of about 170° to about 210° C., said mixture having been produced by oxidizing cumene to form cumene hydroperoxide, concentrating said hydroperoxide and decomposing it in the presence of an acid catalyst; introducing a quantity of water equal to from about 90% to about 150% by weight of the phenol in said mixture at an intermediate point between the point of introduction of the feed-mixture and the bottom of said zone; withdrawing vapors containing substantially all of said alkyl aromatic hydrocarbons and substantially all of the acetone and water in said feed-mixture and containing not more than about 3% by weight of phenol, based upon the phenol content of said feed-mixture; and withdrawing substantially water-free phenol containing less than about 0.05% by weight of hydrocarbons boiling in the range of about 170° C. to about 210° C., from the bottom of said distillation zone.

2. A method which comprises continuously introducing into a distillation zone at an intermediate point thereof a feed-mixture, the predominant components of which are phenol and acetone and which contains less than about 0.5% and more than about 0.05% by weight of alkyl aromatic hydrocarbons boiling from about 170° to about 210° C., said mixture having been produced by oxidizing cumene to form cumene hydroperoxide, concentrating said hydroperoxide and decomposing it in the presence of an acid catalyst, said distillation zone having a separation efficiency of at least twenty theoretical plates; introducing a quantity of water equal to from about 90 to about 150% by weight of the phenol content of said mixture into said zone at a point below the point of feed introduction and above about the lower one-sixth of said zone so as to produce a liquid phase having a water content of at least 10% by weight in the portion of said distillation zone between the point of feed introduction and the point of water introduction; withdrawing vapors comprising predominantly acetone and water and containing substantially all of said alkyl aromatic hydrocarbons and less than about 3% by weight of phenol based upon the phenol in the feed; and withdrawing dry phenol containing less than 0.05% hydrocarbons boiling in the range of about 170° to about 210° C., from the bottom of said distillation zone.

3. The method as defined by claim 1 wherein the water is introduced into the distillation zone in the form of steam.

4. A method which comprises continuously introducing into a distillation zone at an intermediate point thereof a feed-mixture, the predominant components of which are phenol and acetone and which contains less than about 0.5% but more than about 0.05% by weight of alkyl aromatic hydrocarbon boiling in the range of about 170° to about 210° C., said mixture having been produced by oxidizing cumene to form cumene hydroperoxide, concentrating said hydroperoxide and decomposing it in the presence of an acid catalyst; introducing a quantity of water equal to from about 90% to about 150% by weight of the phenol in said mixture at an intermediate point between the point of introduction of the feed-mixture and the bottom of said zone; withdrawing vapors containing substantially all of said alkyl aromatic hydrocarbons and substantially all of the acetone and water in said feed-mixture and containing not more than about 3% by weight of phenol, based upon the phenol content of said feed-mixture; condensing the vapors and returning part of the condensate to the distillation zone as reflux, the reflux ratio being in the range of 0.2:1 to 2:1; and withdrawing substantially water-free phenol containing less than about 0.05% by weight of hydrocarbons boiling in the range of about 170° C. to about 210° C., from the bottom of said distillation zone.

References Cited in the file of this patent

UNITED STATES PATENTS 2,437,649    Milner ---------------- Mar. 9, 1948